B. J. DAUBENHEYER.
WHEEL TREAD.
APPLICATION FILED AUG. 28, 1920.
1,435,815.                                    Patented Nov. 14, 1922.
                                                        2 SHEETS—SHEET 2.
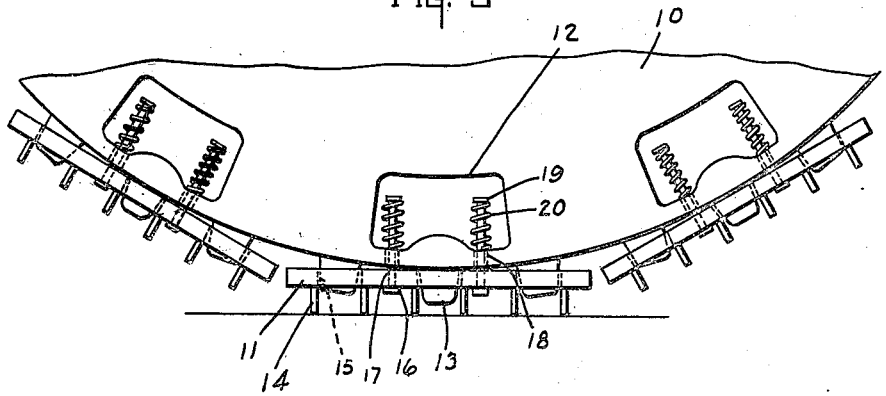
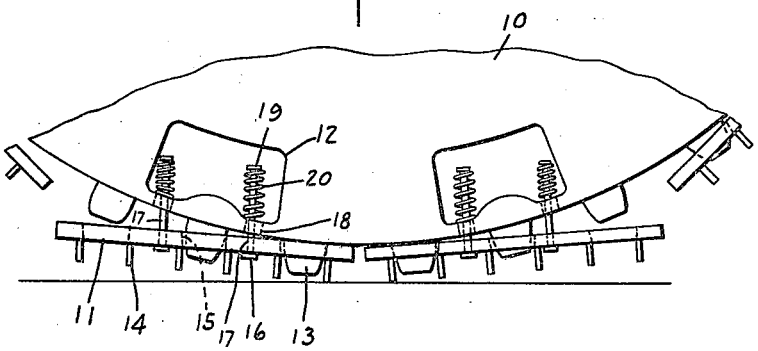
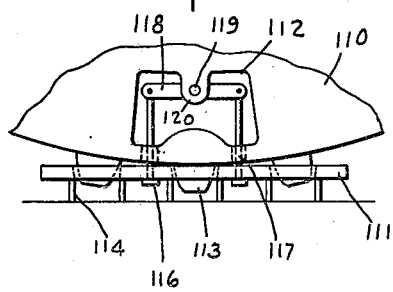
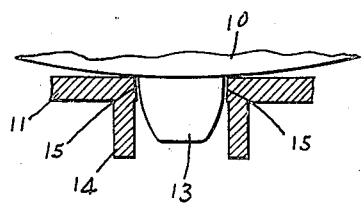
INVENTOR.
BRADFORD J. DAUBENHEYER.
BY
Lockwood & Lockwood
ATTORNEYS.

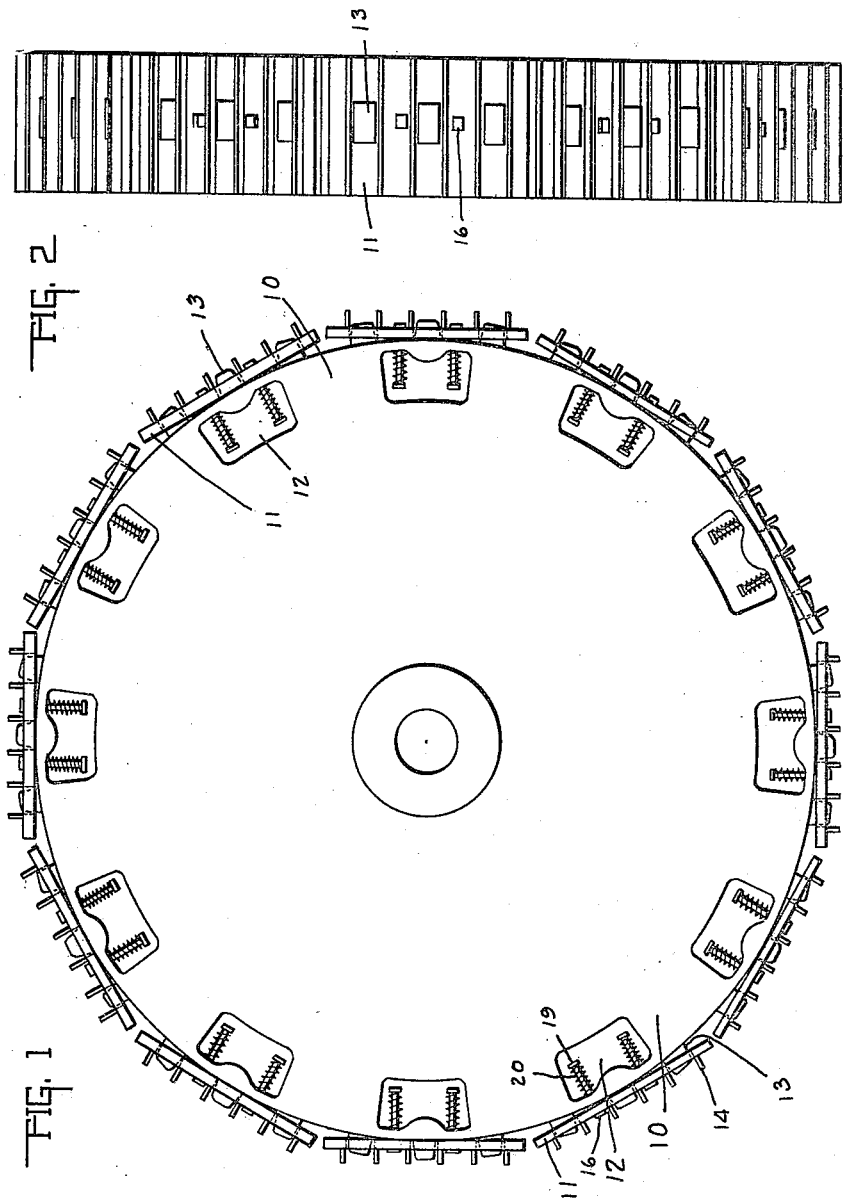

Patented Nov. 14, 1922.

1,435,815

UNITED STATES PATENT OFFICE.

BRADFORD J. DAUBENHEYER, OF INDIANAPOLIS, INDIANA.

WHEEL TREAD.

Application filed August 28, 1920. Serial No. 406,681.

*To all whom it may concern:*

Be it known that I, BRADFORD J. DAUBENHEYER, a citizen of the United States, and a resident of Indianapolis, county of Marion, and State of Indiana, have invented a certain new and useful Wheel Tread; and I do hereby declare that the following is a full, clear, and exact description thereof, reference being had to the accompanying drawings, in which like numerals refer to like parts.

This invention relates to wheel constructions wherein a weight supporting wheel is provided with a plurality of treads, shoes or feet.

The chief object of this invention is to provide a weight supporting wheel, and if desired, a driving wheel with a plurality of feet, which feet provide a track or treadway with which the wheel is associated, so that said wheel and the weight supported thereby will be more efficiently supported and moved, the advantage of which has been long known in the art of treaded wheels.

The chief feature of the invention consists in the detailed construction of the tread, foot or support, and the simplified means for supporting and securing said tread to the weight supporting wheel or driving wheel.

The full nature of the invention will be understood from the accompanying drawings and the following description and claim.

In the drawings, Fig. 1 is a side elevational view of a wheel provided with a plurality of feet or treads, the same embodying the features of the invention. Fig. 2 is an end elevational view of the same. Fig. 3 is an enlarged side view of a plurality of treads and a portion of the wheel and illustrates the parts as shown in Fig. 1. Fig. 4 is a similar view but illustrates said parts in another position. Fig. 5 is an enlarged sectional view of a detail showing a portion of the wheel tread and driving connection therebetween. Fig. 6 is an elevational view of a modified form of the invention.

In the drawings 10 indicates a wheel to which the treads 11 are applied to form a track or treadway upon which said wheel may bear. The treads 11 preferably are sufficient in number to substantially cover the entire wheel periphery, as shown in Fig. 1. Adjacent each tread and formed within the wheel 10 is an opening 12. Upon the periphery of the wheel and in spaced relation are a plurality of preferably generated gear teeth 13. Means in said opening and said gear teeth are adapted to be associated with the several treads to secure the latter to the wheel in a simplified and improved manner. Since each tread and means for securing the same to the wheel and the action thereof are similar, a description of one will suffice for an understanding of them all.

Each tread 11 consists of a plate portion which is positioned substantially tangentially of the wheel periphery, and projecting from said plate portion are a plurality of gripping flanges 14, said flanges being secured to said plate portion 11 in spaced relation and being positioned at right angles to said plate portion. As shown clearly in Fig. 1, said gripping projections preferably extend parallel to the wheel axis and increase the tractive effect of the tread. In the present instance, see Fig. 2, each of the treads 11 is preferably slotted at 15 and 16, the slot 15 being adapted to receive the tooth 13 and the slot 16 being adapted to receive other means hereinafter to be described. As shown in Figs. 2 and 3, the slots are of different sizes, one size being for the gear tooth and the other for the means to be described, said slots being alternated. Figs. 3 and 4 show that each tread is provided with three gear teeth receivable openings 15 separated by two other openings 16. It will be understood, as shown in Fig. 2, that said openings are positioned medianly of the tread. As shown clearly in Fig. 5, the tooth 13 is preferably generated and the slot 15 is similarly formed to accommodate said tooth.

Positioned in each of the slots 16 is a bolt member 17 provided with a suitable head for preventing the passage of said bolt member through the slot 16. Communicating with each of the openings 12 and in spaced relation are a plurality of elongated slots 18, said slots being elongated circumferentially of the wheel. Each slot 18 is adapted to receive a radially and inwardly projecting bolt or securing member 17 and the walls of said slot prevent said bolt member from moving axially of the wheel, which in turn prevents the tread from moving axially of the wheel, said axial movement being further prevented by the tooth 13 associated with said tread. The free end of the bolt member 17 is provided with suitable securing means, such as the nut 19, and between said nut and the wall of the opening 12 through which said bolt projects, there is positioned a coiled spring member 20. This construction secures the treads to the wheel.

As shown in Fig. 3, the tread 11 is shown in one position and in Fig. 4, said tread has moved rearwardly in the forward movement of the vehicle to which the wheel is secured. It will be noted from Fig. 4 that when but one tread is supporting the wheel, three entire teeth 13 are associated with the driving tread thereof. As shown in Fig. 4 when the plurality of treads are supporting the wheel, at least four of the teeth engage the supporting treads and transmit motion. The present construction provides for a rolling action such that the tread surface in engagement with the supporting earth or roadway is always tangential to the wheel periphery. It will be noted that the teeth 13, in addition to their driving function and their alignment feature, also prevent side slipping of the wheel and tread.

In Fig. 6 is illustrated a modified form of the invention wherein means for securing said treads is slightly different from that heretofore shown. This construction is very practical when the diameter of the supporting wheel is sufficiently large to insure that the parallelogram securing means of this modification will be operative without destroying the tangential feature of the invention. In Fig. 6 the supporting wheel is indicated by the numeral 110, the supporting treads by 111, the opening by 112, the gear teeth 113, the supporting feet or gripping members by 114 and the supporting and securing bolt members by 117. The adjacent ends of the bolt members 117 are pivotally supported by a walking beam or lever 118, which in turn is pivotally supported at 119 in a bracket 120 formed integral with the wheel and which projects into the opening 112, as shown. Slight inequalities are accommodated by the bolts 117 having a sliding engagement in the slots 116.

The invention claimed is:

In a wheel construction, the combination with a wheel rim, and a plurality of supporting treads substantially encircling said rim, of a plurality of radially projecting gear teeth secured upon said rim in spaced relation with each other, each of said treads having three gear teeth receiving openings, a pair of other openings in alternate relation therewith, all of said openings being in alignment, a pair of rods secured at one end to each of said treads and seatable in said pair of other openings, said rim having a pair of slots therein separated by a gear tooth, said rods passing through said slots, the latter permitting rocking movement of said rods, and means associating the other ends of said rods, and said wheel rim to permit rocking movement of said treads and securing said treads to said rim.

In witness whereof, I have hereunto affixed my signature.

BRADFORD J. DAUBENHEYER.